United States Patent [19]

Marks et al.

[11] Patent Number: 5,321,116

[45] Date of Patent: Jun. 14, 1994

[54] PROCESS FOR PREPARING RANDOM COPOLYCARBONATE

[75] Inventors: Maurice J. Marks; Thoi H. Ho, both of Lake Jackson, Tex.

[73] Assignee: The Dow Chemical Company, Midland, Mich.

[21] Appl. No.: 43,125

[22] Filed: Apr. 5, 1993

Related U.S. Application Data

[62] Division of Ser. No. 730,327, Jul. 15, 1991, Pat. No. 5,212,282.

[51] Int. Cl.$^5$ .............................................. C08G 64/20
[52] U.S. Cl. ..................... 528/204; 528/125; 528/126; 528/171; 528/174; 528/196; 528/198; 528/201; 528/202
[58] Field of Search ............... 528/204, 125, 126, 171, 528/174, 196, 198, 201, 202

[56] References Cited

U.S. PATENT DOCUMENTS 5,212,282  5/1993  Marks et al. ..................... 528/196

FOREIGN PATENT DOCUMENTS 1122003  10/1965  United Kingdom .

OTHER PUBLICATIONS

CA 102:150202f.
CA 101:172651h.
CA 98:198836a.
CA 98:5067k.
CA 95:98589h.
CA 95:63166r.
CA 87:118607c.
CA 86:44363a.
CA 73:110477a.
CA 80:3818k.
CA 76:100373m.
CA 65:17088h.
CA 104:169090f.
CA 103:142392y.
CA 90:138466w.
CA 80:48543h.
Synthesis of Copolycarbonates from Bisphenol A and Tetrachlorobisphenol A by Successive Addition of Monomers Ikeda and Sekine, *Ind. Eng. Chem. Prod. Res. Develop.*, vol. 12, No. 3, 1973, pp. 202–212.

*Primary Examiner*—Harold D. Anderson

[57] ABSTRACT

A process for preparation of a random copolycarbonate from an ortho-substituted dihydric phenol and a non-ortho-substituted dihydric phenol.

18 Claims, 4 Drawing Sheets

FIG. 4

PROCESS FOR PREPARING RANDOM COPOLYCARBONATE

CROSS-REFERENCE TO RELATED APPLICATION

This is a divisional of application Ser. No. 07/730,327 filed Jul. 15, 1991 now U.S.P. 5,212,282.

FIELD OF THE INVENTION

This invention relates to a process for the preparation of random copolycarbonate.

BACKGROUND OF THE INVENTION

Polycarbonate has found many uses as a class of materials because it combines, in general, a high level of heat and impact resistance, good dimensional stability, and good insulating and non-corrosive properties. The components typically used in the preparation of polycarbonate are a dihydric phenol and a carbonate precursor. Polycarbonate prepared, for example, from an ortho-substituted dihydric phenol frequently exhibits desirable properties such as a high level of hydrolytic stability and resistance to thermal deformation. When different kinds of dihydric phenols are used to prepare a polycarbonate, such as an ortho-substituted dihydric phenol and a non-ortho-substituted dihydric phenol, a carbonate copolymer, or copolycarbonate, results. However, the properties of a copolycarbonate may differ from those of homopolycarbonates formed from the respective monomers.

Depending on the distribution along the polymer chain of the respective residues of different kinds of dihydric phenols used in forming a copolycarbonate, two of the sequence classifications into which a linear copolycarbonate commonly falls are that of a random or a block copolycarbonate. It is usually found that a random copolymer has physical and chemical properties which are about the weighted average of those of homopolymers prepared from the separate comonomers. Block copolymers, on the other handy generally display properties which represent both an average of the individual homopolymer properties as well as properties derived from the individual homopolymers themselves.

Often, the fact that a random copolymer is characterized (with insignificant exceptions) by such an average of properties makes it a preferred choice of material compared to a block copolymer because some of the behavior of a block copolymer will always be derived from the properties of homopolymeric segments formed from the separate comonomers. Consequently, it would be advantageous to have a process for the preparation of random copolycarbonate particularly a random copolycarbonate made from ortho-substituted dihydric phenols and non-ortho-substituted dihydric phenols.

SUMMARY OF THE INVENTION

In one aspect this invention involves a process for the preparation of a random copolycarbonate comprising (a) contacting an ortho-substituted dihydric phenol and a carbonate precursor to form therefrom the monomeric bisester of the ortho-substituted dihydric phenol [hereinafter referred to as the "bis(carbonate precursor)ester of the ortho-substituted dihydric phenol"], (b) contacting the bis(carbonate precursor)ester with a non-ortho-substituted dihydric phenol to form a random carbonate oligomer, (c) contacting the random carbonate oligomer with a carbonate precursor to form a random copolycarbonate, and (d) recovering the random copolycarbonate.

The process of this invention produces, from an ortho-substituted and a non-ortho-substituted dihydric phenol, a random copolycarbonate which combines in a desirable balance the more advantageous properties of a homopolymer prepared separately from each of the comonomers. Such combination of properties in the random copolycarbonate is more desirable than the properties of a block copolycarbonate prepared from the same ortho-substituted and non-ortho-substituted dihydric phenols.

The process of this invention is useful for producing a random copolycarbonate which may be employed, for example, as a membrane, film, fiber, extruded sheet, multi-layer laminate or molded or shaped article of virtually any variety, particularly those for use in the automotive and electronics industries. When softened by the application of heat, the random copolycarbonate of this invention may be readily formed or molded using conventional techniques such as vacuum or thermoforming, or compression injection, extrusion or blow molding techniques alone or in combination for fabrication into any of the items mentioned above. Random copolycarbonate can also be compounded with one or more other organic or inorganic substances.

DETAILED DESCRIPTION OF THE INVENTION

This invention involves the copolymerization of an ortho-substituted dihydric phenol with a non-ortho-substituted dihydric phenol to form a random copolycarbonate.

A random copolycarbonate may be distinguished from a block copolycarbonate by the distribution within the molecule of the residues of the comonomers from which it is prepared. If, for example, A represents the residue of an ortho-substituted dihydric phenol and B represents the residue of a non-ortho-substituted dihydric phenol, a block copolycarbonate prepared from A and B is characterized by a chain sequence which is predominantly made up of A—A and B—B linkages through a carbonyl carbon. With insignificant exceptions, the only A-B linkages appearing in a block copolycarbonate in diblock (ABy) or triblock (AxByAx) form, where x and y are those necessary to join the A and B blocks. The blocks themselves, of either A or B residues, may appear in diblock (ABy) or triblock (Ax-ByAx) where x and y are the numbers of A and B units in the blocks, respectively, or may appear in segmented block form, $(A_xB_y)_n$, where x and y are as aforesaid, and n is the number of A block/B block couplets in the molecule.

A random copolycarbonate, by contrast, is characterized by a mixture of individual A and B residues together with A blocks and B blocks, and the sequence in the chain of those various components does not follow any regularly repeating pattern. A random copolycarbonate consequently contains A-B, A—A and B—B linkages in a statistical distribution based on the relative starting concentrations of the comonomers from which it is prepared. The expected number average sequence length, N, of an A—A or B—B segment within the molecule, as a function of the ratio of starting comonomer concentrations, is given by $$N_a = 1 + r_a([A]/[B])  \quad\quad I$$

and $$N_b = 1 + r_b([B]/[A])  \quad\quad II$$

where
- $N_a$ is the number average sequence length of the A—A segments,
- $N_b$ is the number average sequence length of the B—B segments,
- $r_a$ is the ratio of the rate constants $k_{11}/k_{12}$,
- $k_{11}$ is the rate constant for the reaction $A + A \rightarrow A—A$,
- $k_{12}$ is the rate constant for the reaction $A + B \rightarrow A\text{-}B$,
- $r_b$ is the ratio of the rate constants $k_{22}/k_{12}$,
- $k_{22}$ is the rate constant for the reaction $B + B \rightarrow B—B$,
- [A] is the starting concentration of monomer A, and
- [B] is the starting concentration of monomer B.

Because a catalyst is used in the process of this invention for the preparation of a random copolycarbonate, $r_a$ and $r_b$ are each approximately equal to 1.

Strictly speaking, it is also possible to obtain from comonomers A and B an alternate copolycarbonate, which has exclusively A-B linkages. An alternate copolycarbonate however, offers no advantage over a random copolycarbonate in terms of properties, and it is more difficult to prepare than a random copolycarbonate.

A number of analytical techniques can be used to distinguish a random copolycarbonate prepared from ortho-substituted dihydric phenols and non-ortho-substituted dihydric phenols from a block copolycarbonate prepared therefrom. Carbon-13 nuclear magnetic resonance ("NMR") spectra of a copolycarbonate shows resolved A—A, A-B and B—B carbonate resonances and allows calculation of average sequence distributions and number average sequence lengths. For a copolycarbonate prepared from an equi-molar mixture of an ortho-substituted dihydric phenol and a non-ortho-substituted dihydric phenol, the number average sequence length for a block copolycarbonate is greater than 2.0, while that for a random copolycarbonate is between 1.0 and 2.0. The number average sequence length for a perfectly random copolycarbonate is 2.0, while an average less than 2.0 indicates that the molecule, while still random, nevertheless has some regions of alternate character. Although as the number average sequence length approaches 1.0, a greater proportion of alternate character is indicated, a copolycarbonate may still be classified as "random" despite the fact that its number average sequence length is less than 2.0 being that which characterizes an ideal random copolycarbonate.

One exemplary property which is sensitive to copolymer chain sequence architecture is engineering modulus. Engineering modulus is conveniently measured as a function of temperature by dynamic mechanical analysis ("DMA"). A block copolymer shows changes in modulus based on the properties of its component segments whereas a random copolymer shows such changes based on an average of two (or more) components. Changes in engineering modulus in DMA tests are readily seen in the tan delta curve, which is the first derivative of the modulus v. temperature curve. The tan delta curve of a block copolymer shows secondary (second order) transitions for each block present, while that of a random copolymer shows a single secondary transition at an average temperature.

In the process of this invention—the process for making the random copolycarbonate of this invention—polycarbonate can be prepared by the reaction of a dihydric phenol and a carbonate precursor such as a carbonic acid derivative, a haloformate or a carbonate ester. These components are usually reacted by means of the phase boundary process in which the dihydroxy compound is dissolved and deprotonated in an aqueous alkaline solution and the carbonate precursor is dissolved in an organic solvent. The aqueous alkaline solution has a pH greater than 7.0 and can be formed from a base which may be selected from those including the alkali metal and alkaline earth metal phosphates bicarbonates oxides and hydroxides. A preferred base for preparing the aqueous alkaline solution is a caustic soda such as NaOH.

These components may be reacted for example, by means of a mixture which is prepared initially from the dihydroxy compound, water and a non-reactive, immiscible organic solvent selected from among those in which the carbonate precursor and polycarbonate product are soluble. Representative solvents include chlorinated hydrocarbons such as methylene chloride 1,2-dichloroethane, tetrachloroethane, chlorobenzene, and chloroform, to which tetrahydrofuran dioxane nitrobenzene, dimethyl sulfoxide, xylene, cresol or anisole may be added, if desired. Caustic soda or other base is then added to the reaction mixture to adjust the pH of the mixture to a level at which the dianion of the dihydroxy compound is formed. A reducing agent such as sodium sulfite or sodium dithionite can also be advantageously added to the reaction mixture.

A carbonate precursor is contacted with an agitated mixture of the aqueous alkaline solution of the dihydroxy compound, and, for such purpose, the carbonate presursor can be bubbled into the reaction mixture in the form of a gas, or can be dissolved and introduced in solution form. The mixture is agitated in a manner which is sufficient to disperse or suspend droplets of the solvent containing the carbonate precursor in the aqueous alkaline solution. Reaction at the interface of the organic and aqueous phases created by such agitation yields the bis(carbonate precursor)ester of the dihydroxy compound. For example, if the carbonate precusor is a carbonyl halide such as phosgene the products of this initial phase of the process are predominantly monomers in dichloroformate form accompanied by lesser amounts of oligomers which are either mono- or dichloroformates or bisphenolate ions.

These intermediate carbonates dissolve in the organic solvent as they form, and they can then be condensed to a higher molecular weight polycarbonate by contact with a catalyst of which the following are representative: a tertiary amine such as triethyl amine or an activated pyridine; a hindered secondary amine such as diisopropyl amine; a cyclic aza compound such as 2,2,6,6-tetramethyl piperidine or 1,2-dimethylimidazole; an amidine or aminoamidine compound such as 1-methyl-2-phenyliminopyrrolidine; an isourea compound such as N,N-dibutyl-N'-phenyl-o-methylisourea; an iminoether or iminocarboxylate compound such as 1-aza-2-methoxy-1-cycloheptene or t-butyl-cyclohexyliminoacetate; or a phosphonium, sulfonium, arsonium or quaternary ammonium compound. Activated pyridines which are particularly useful as catalysts in the preparation of a random copolycarbonate by the process of this invention include either a pyridine or pyridine salt whose catalytic activity is increased by a substituent at the 2 or 4 ring position. Suitable 4-aminopyridines for use according to the present invention are 4-dimethylaminopyridine 4-pyrrolidino-pyridine and poly(N,N-dialkylaminopyridine). Examples of suitable 2-substituted pyridines are methylpyridine ethylpyridine, isopropylpyridine and polyvinyl pyridine. Activated pyridines having additional alkyl groups, such as those represented by the formulae:

may also be used, where R is a monovalent alkyl radical, a cycloalkyl radical or a polymer chain such that the formula weight of the catalyst is less than 50,000; $R^1$ and $R^2$ are each independently a monovalent alkyl radical or a polymer chain, such that the formula weight of the catalyst is less than 50,000, or $R^1$ and $R^2$ are $C_1$–$C_8$ alkyl radicals which are joined and, together with N, form a cyclic structure; and $R^3$ is independently hydrogen or a monovalent $C_1$–$C_8$ alkyl radical. A preferred activated pyridine is 4-dimethylaminopyridine.

The molecular weight of the random copolycarbonate can be controlled by addition to the reaction mixture of a chain terminator which may be selected from monofunctional substances such as phenols, alcohols, amines, imides, carbonic acid chlorides, sulfonic acid chlorides, or phenylchlorocarbonates. Addition of a chain terminator may be made to the reaction mixture before or after a dihydroxy compound is contacted with a carbonate precursor.

Upon completion of polymerization, the organic and aqueous phases are separated to allow purification of, and recovery of the polycarbonate product from, the organic phase. The organic phase is washed as needed in a centrifuge with water dilute base and/or dilute acid until free of unreacted monomer, residual process chemicals and/or other electrolytes. Recovery of the polycarbonate product from the organic phase can be effected by spray drying, steam devolatilization, direct devolatilization in a vented extruder, or precipitation by use of an anti-solvent such as toluene cyclohexane, heptane, methanol, hexanol or methyl ethyl ketone.

The reaction can be run at a temperature between 0° C.–100° C., although usually not in excess of the boiling point of the solvent used. Frequently, the reaction is run at a temperature of about 0° C. to about 45° C.

Examples of ortho-substituted dihydric phenols suitable for use in the preparation of a random copolycarbonate include variously bridged aromatic diols (or mixtures thereof) having a substituent other than hydrogen on the carbon atom on each phenyl ring at the 3 and/or 5 position(s) when the hydroxyl group is at the 4 position, represented generally by the formula wherein:
(I) Z is (A) a divalent radical, of which all or different portions can be (i) linear, branched, cyclic or bicyclic, (ii) aliphatic or aromatic, and/or (iii) unsaturated, said divalent radical being composed of 1–35 carbon atoms together with up to five oxygen, nitrogen, sulfur, phosphorous and/or halogen (such as fluorine, chlorine and/or bromine) atoms; or (B) S, $S_2$, SO, $SO_2$, O or CO; or (C) a single bond;
(II) each X is independently a halo radical (such as fluorine, chlorine and/or bromine), or a $C_1$–$C_{12}$ linear or cyclic alkyl, alkoxy, aryl or aryloxy radical, such as methyl, ethyl, isopropyl, cyclopentyl cyclohexyl, methoxy, ethoxy, benzyl, tolyl, xylyl, phenoxy and/or xylynoxy; and
(III) a, b, c, and d are each 0 or 1, provided that a and b cannot both be 0, and c and d cannot both be 0.

For example, the bridge represented by Z in the above formula can be a carbon atom to which is bonded one or more groups such as $CH_3$, $C_2H_5$, $C_3H_7$, n-$C_3H_7$, i-$C_3H_7$, cyclohexyl, bicyclo[2.2.]heptyl, benzyl, $CF_2$, $CF_3$, $CCl_3$, $CF_2Cl$, CN, $(CH_2)_2COOCH_3$, or PO-$(OCH_3)_2$.

Ortho-substituted dihydric phenols of particular interest and usefulness in this invention are 2,2-bis(3,5-dibromo4-hydroxyphenyl) propane ("Tetrabromo Bisphenol-A" or "TBBA"), 2,2-bis(3,5-dibromo,4-hydroxyphenyl) propane ("Tetrabromo Bisphenol-A"), and 2,2-bis(3,5-dimethyl,4-hydroxyphenyl) propane ("Tetramethyl Bisphenol-A").

Non-ortho-substituted dihydric phenols which are useful in this invention can be defined as any of the dihydric phenols described above which have only hydrogen bonded to the carbon atoms at both the 3 and 5 positions on both phenyl rings. Representative non-ortho-substituted dihydric phenols of particular interest in this invention include the following:
bis(4-hydroxyphenyl)sulphone,
bis(3-hydroxyphenyl)sulphone,
bis(2-hydroxyphenyl)sulphone,
bis(4-hydroxyphenyl)ketone,
bis(4-hydroxyphenyl)methane,
1,1-bis(4-hydroxyphenyl)propane,
1,1-bis(4-hydroxyphenyl)butane
1,1-bis(4-hydroxyphenyl)heptane,
1,1-bis(4-hydroxyphenyl)cyclopentane,
1,1-bis(4-hydroxyphenyl)cyclohexane,
2,2-bis(4-hydroxyphenyl)propane,
bis(hydroxyphenyl)fluorene;
and the like. Among these, 2,2-bis(4-hydroxyphenyl)-propane ("Bisphenol-A") is especially preferred.

The random copolycarbonate of the present invention can also be prepared from dihydroxy benzenes such as pyrocatechol, resorcinol and hydroquinone, and from dihydroxy naphthalenes and anthracenes and their halo-, alkyl- and aryl-substituted derivatives.

The preferred process of this invention is that in which an aromatic random copolycarbonate is prepared. An aromatic random copolycarbonate is defined herein with reference to the oxygen atoms, of the dihydric phenols present in the copolycarbonate chain, which are bonded to a carbonyl carbon. In an aromatic random copolycarbonate, all such oxygen atoms are bridged by a dihydric phenol residue.

Steps of particular importance in the preparation of a random copolycarbonate by the process of this invention involve a two-phase polycondensation system. In this method an aqueous solution is formed by first admixing an ortho-substituted dihydric phenol, a non-reactive, immiscible organic solvent, and water. This aqueous mixture is cooled while addition is made thereto of an amount of base sufficient to impart to the mixture a pH at which the ortho-substituted dihydric phenol is in the form of a dianion. The pH at which the ortho-substituted dihydric phenol is in dimetal salt form will vary between 7.0 and 14.0 depending on the acidity of the particular ortho-substituted dihydric phenol.

To obtain the bis(carbonate precursor)ester of the ortho-substituted dihydric phenol, a carbonate precursor such as phosgene is added to the mixture with rapid stirring while the pH is maintained, by the addition of further base, at about the pH of an aqueous equilibrium solution of the dimetal salt of the ortho-substituted dihydric phenol. If phosgene is used as the carbonate precursor, the bis(carbonate precursor)ester formed from the ortho-substituted dihydric phenol is a bis-chloroformate. Substantial completion of the reaction to form the bis(carbonate precursor)ester is indicated by substantial absence of the ortho-substituted dihydric phenol from the aqueous phase of the reaction mixture. The bis(carbonate precursor)ester formed at this point in the process is predominantly monomeric rather than oligomeric. However, the bis(carbonate precursor)ester of the ortho-substituted dihydric phenol formed by methods other than as specifically described above in this paragraph may also be used in the process of this invention, for example those disclosed in R. Barclay, Jr., "Bisphenols and Their Chloroformates" in *Condensation Monomers*, J.K. Stille, editor, Wiley, New York, 1972, pages 589–649; and U.S. Pat. No. 3,959,335, each being incorporated herein.

After formation of the bis(carbonate precursor)ester of the ortho-substituted dihydric phenol, addition is made to the reaction mixture of a non-ortho-substituted dihydric phenol as well as a further amount of solvent, if needed to impart to the random copolycarbonate product a viscosity suitable for purification. With stirring, addition is also made of an amount of base sufficient to impart to the reaction mixture a pH at which the non-ortho-substituted dihydric phenol is in the form of a dianion. The pH at which the non-ortho-substituted dihydric phenol is in dimetal salt form will vary between 7.0 and 14.0 depending on the acidity of the particular non-ortho-substituted dihydric phenol.

A coupling catalyst is then added to the mixture with stirring while the pH is maintained, by the addition of further base, at about the pH of an aqueous equilibrium solution of the dimetal salt of the non-ortho-substituted dihydric phenol. This promotes formation of phenolic-terminated random carbonate oligomers from the bis(carbonate precursor)ester of the ortho-substituted dihydric phenol and the dianion of the non-ortho-substituted dihydric phenol. Substantial completion of the reaction to form random carbonate oligomers is indicated by substantial absence of the bis(carbonate precursor)ester of the ortho-substituted dihydric phenol from the organic phase of the reaction mixture. These random carbonate oligomers have a weight average molecular weight of about 1,000 to about 100,000.

Further carbonate precursor is then added to the reaction mixture to promote the formation of high molecular weight copolycarbonate containing in the polymer chain, on average, residues of the ortho-substituted dihydric phenol and the non-ortho-substituted dihydric phenol in random order. The dianions of the random oligocarbonates are formed and are linked through the carbonyl carbon of the carbonate precursor. As this phase of the reaction progresses, the pH of the reaction mixture reaches a level below the pH of an aqueous equilibrium solution of the dimetal salt of the less acidic of the ortho-substituted dihydric phenol and the non-ortho-substituted dihydric phenol, at which point substantial completion of the formation of the high molecular weight random copolycarbonate is indicated. The final product is recovered by conventional methods, as described above.

Using a process such as is generally described above, a random copolycarbonate can be obtained having a weight average molecular weight, as determined by gel permeation chromatography using a Bisphenol-A polycarbonate standard, of 10,000 to 400,000. The random copolycarbonate of this invention is also characterized by a number average sequence length less than or equal to that given by a random distribution within the copolycarbonate molecule of the respective residues of the ortho-substituted dihydric phenol and the non-ortho-substituted dihydric phenol.

The process of the present invention may be conducted in a single reaction vessel, or may be conducted independently in a series of individual reaction vessels wherein at least a portion of the reaction mixture prepared in a first reaction vessel in a first step is transferred to a second reaction vessel wherein another step is conducted, and so on throughout the process. The contemplated individual reaction vessels may additionally be continuous or batch reactors. The process may also be conducted in a continuous reaction system, such as a tubular reactor, wherein the reaction system contains multiple reaction zones.

The random copolycarbonate of this invention may or may not include, as desired, those prepared, for example, by reaction of one or more ortho-substituted dihydric phenols and one or more non-ortho-substituted dihydric phenols with a carbonate precursor and additional reactants such as the following: a dicarboxylic acid (or derivative) or a hydroxycarboxylic acid; a chlorine- or amino-terminated polysiloxane; a hydroxy-terminated poly(phenylene oxide) or poly(methyl methacrylate); phosphonyl dichloride; or an aromatic ester of a phosphonic acid. Siloxane/carbonate block copolymers are discussed in greater detail in Paul U.S. Pat. No. 4,596,970 and poly(ester/carbonate)s are discussed in greater detail in Swart, U.S. Pat. No. 4,105,533, both of which are incorporated herein in their entirety.

A branched rather than linear polycarbonate molecule can be obtained by adding to the reaction mixture a tri- or polyfunctional monomer such as a tri-or tetrafunctional phenol or carboxylic acid (or derivative thereof such as an acyl halide or anhydride) a bisphenol containing carboxylic acid side groups, or a nitrogen-containing compound such as cyanuric chloride, or compounds containing a mixture of such groups.

Polycarbonate blends can be prepared from a random copolycarbonate by admixing two or more different random cooolycarbonates; or by admixing a random copolycarbonate with one or more other kinds of carbonate polymers, such as an alternating or block copolycarbonate a homopolycarbonate (being that which is prepared from only one dihydroxy compound), or a poly(ester/carbonate); and/or with one or more other kinds of polymers or copolymers, such as polyethylene, polyester, polyacetal polyamide, polysulfone poly(phenylene oxide) acrylonitrile/butadiene/styrene copolymer, methacrylate/butadiene/styrene copolymer, and/or styrene/maleic anhydride copolymer.

The process of this invention for the preparation of a random copolycarbonate can further involve compounding with the random copolycarbonate product conventional thermoplastic polymer additives which include, but are not limited to, fillers, thermal stabilizers, dyes, flame retarding agents, reinforcing agents, softeners, mold-release agents, seed-forming agents, pigments, plasticizers, antistatic agents, UV absorbers, lubricants, compatibilizers, and the like, in conventional amounts generally not exceeding 25 percent, and preferably not exceeding 5 percent, by weight of the total composition.

ILLUSTRATIVE EMBODIMENTS

To illustrate the practice of this invention, an example of a preferred embodiment is set forth below. It is not intended, however, that this example (Example 1) should in any manner restrict the scope of this invention. Some of the particularly desirable features of this invention may be seen by contrasting the characteristics of Example 1 with those of a controlled process (Control A) which does not possess the features of, and is not therefore an embodiment of, this invention.

Example 1.

A one liter resin kettle is fitted with a mechanical stirrer, a stirrer baffle, a pH electrode, a thermometer, a phosgene inlet tube, a liquid inlet tube, and a gas outlet tube connected to phosgene scrubber. The reactor is purged with nitrogen and is charged with 38.07 grams (0.07 mole) of Tetrabromobisphenol-A ("TBBA"), 0.42 grams (0.0045 mole) phenol 300 ml dichloromethane and 400 ml deionized water. The mixture is cooled in an ice bath while 50 percent sodium hydroxide solution is added until the solution has a pH of 10. Phosgene (16 grams, 0.16 mole) is added to the rapidly stirred mixture at about 1 gram/minute while a pH of 10 is maintained by caustic solution addition. Then 15.98 grams (0.07 mole) Bisphenol-A 0.02 grams ($1.5 \times 10^{-4}$ mole) dimethylaminopyridine, and 100 ml dichloromethane are added. The pH is raised to 12.5 with caustic, and the mixture is stirred for fifteen minutes. The high molecular weight random copolycarbonate is formed by addition of 3 grams (0.03 mole) of phosgene. The pH of the polymer mixture is reduced to 7 with phosgene. The organic and aqueous phases are allowed to separate the aqueous phase is removed and the organic phase is washed once with dilute hydrochloric acid and twice with deionized water.

A film is made from a portion of the polymer solution which, when tested by size exclusion chromatography ("SEC" Bisphenol A polycarbonate standard), indicates a weight average molecular weight of 32,100, and a number average molecular weight of 17,250; and when tested by differential scanning calorimetry ("DSC") indicates a glass transition temperature of 204° C. The 400 MHz carbon-13 NMR spectrum of the random copolymer in deuterodichloromethane gave the three carbonate resonances A—A, B—B, and A-B in a ratio of 1:1:4. This ratio corresponds to an average sequence distribution of $[A(AB)_2B]_n$ and a number average sequence length of 1.5.

CONTROL A

To the reactor as described above is added 38.07 grams (0.07 mole) Tetrabromobisphenol-A, 15.98 grams (0.07 mole) Bisphenol-A, 0.42 grams (0.0045 mole) phenol, 300 ml dichloromethane, and 400 ml deionized water. The mixture is cooled in an ice bath while brought to a pH of 12.5 by the addition of caustic solution. Phosgene (30 grams, 0.30 mole) is added at about 1 gram/minute while a pH of 12.5 is maintained by caustic addition. Then 200 ml dichloromethane and 0.03 grams ($3 \times 10^{-4}$ mole) dimethylaminopyridine are added. The mixture is stirred for 15 minutes while a pH of 12.5 is maintained. The resulting polymer mixture is separated and washed as described above.

A film is made from a portion of the polymer solution which, when tested by SEC, indicates a weight average molecular weight of 32,270 and a number average molecular weight of 17,330; and, when tested by DSC, indicates a glass transition temperature of 200° C. The carbon-13 NMR spectrum of the segmented block copolymer in deuterodichloromethane gave the three carbonate resonances A—A, B—B, and A-B, in a ratio of 4:4:1. This ratio corresponds to an average sequence distribution of $[A_{8.7}B_{8.7}]_n$ and a number average sequence length of 8.7.

A comparison of the results obtained in Example 1 and Control A shows the differences in the copolycarbonates prepared by each of the different processes. The copolycarbonate prepared by a process of this invention, Example 1, shows a carbon-13 NMR spectrum ratio which corresponds to a number-average sequence length of 1.5, indicating a random copolycarbonate, whereas the copolycarbonate prepared by the process of Control A shows a sequence length of 8.7, indicating a block copolycarbonate.

Dynamic mechanical analysis of the copolycarbonates obtained, respectively, in Example 1 and Control A also shows differing results, which indicates the random and block characteristics of the two samples, respectively. Example 1 and Control A show significant differences in low temperature engineering modulus due to their differing chain sequence architecture. These values are normalized based on the −130° C. modulus values to account for instrument variables, and are shown below in Table I.

TABLE I

| | Engineering Modulus in MPa for Control A and Example 1 | |
|---|---|---|
| °C. | Control A | Example 1 |
| −130 | 3.090 | 3.090 |
| −50 | 2.772 | 2.884 |
| 0 | 2.512 | 2.570 |
| 25 | 2.399 | 2.455 |

It can be seen from these data that the engineering modulus of Control A, the block copolycarbonate, is lower at −50° C., 0° C. and 25° C. than that of Example 1, the random copolycarbonate.

Figure 1:
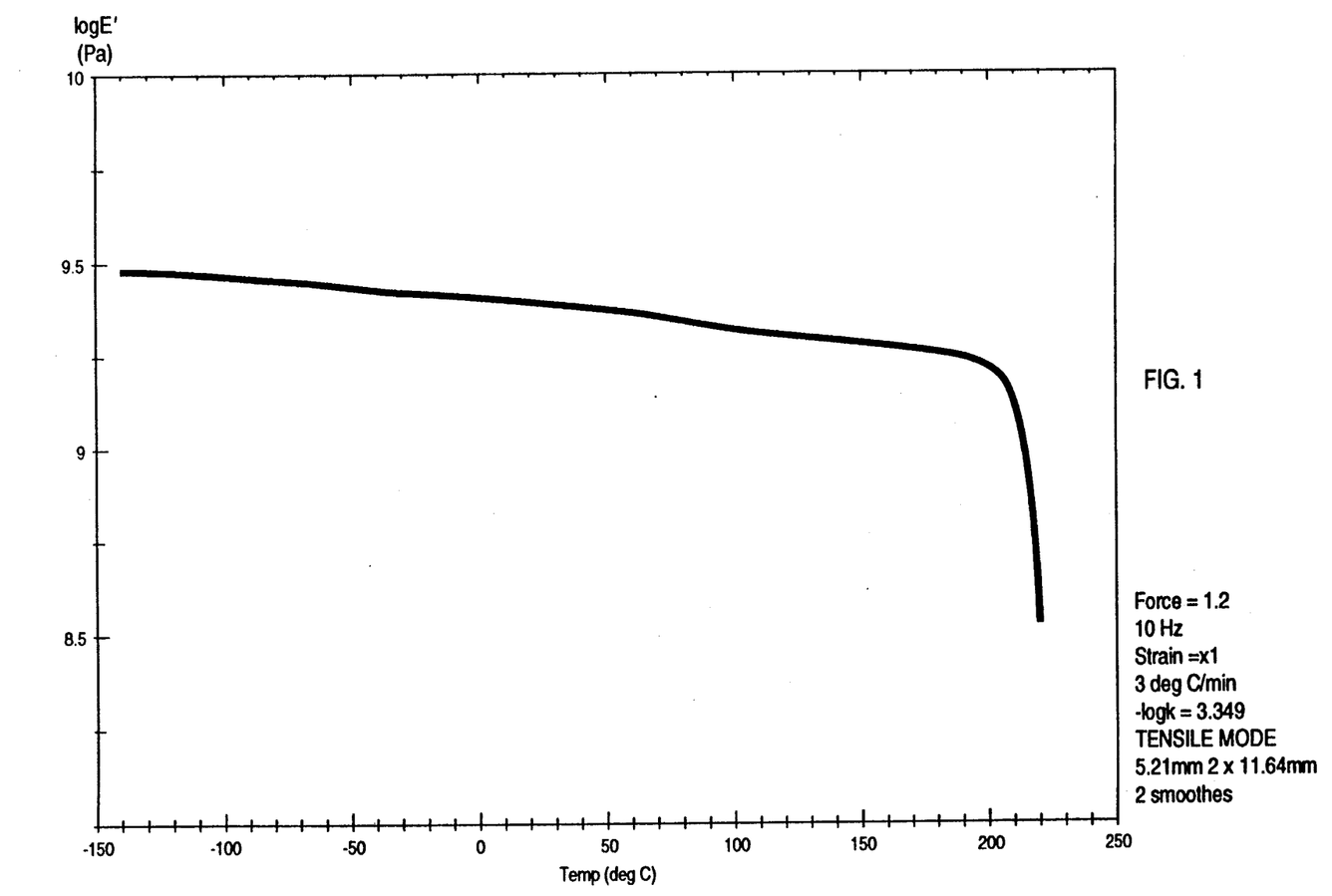
FIG. 1 is a curve showing engineering modulus vs. temperature for a segmented block 1:1 Bisphenol-A/Tetrabromobisphenol-A copolycarbonate.
Figure 2:
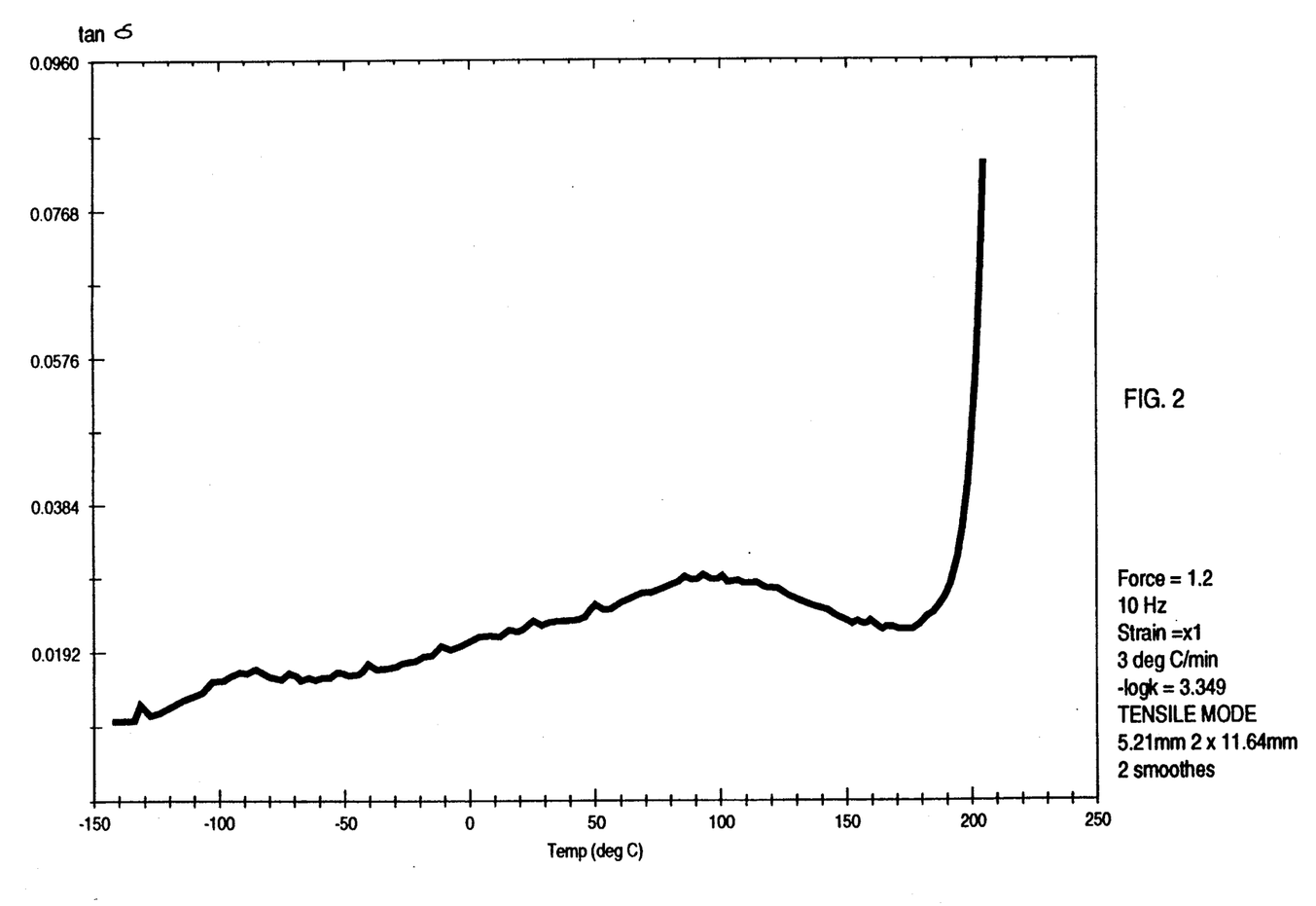
FIG. 2 is a curve showing the first derivative of the curve shown in FIG. 1.
Figure 3:
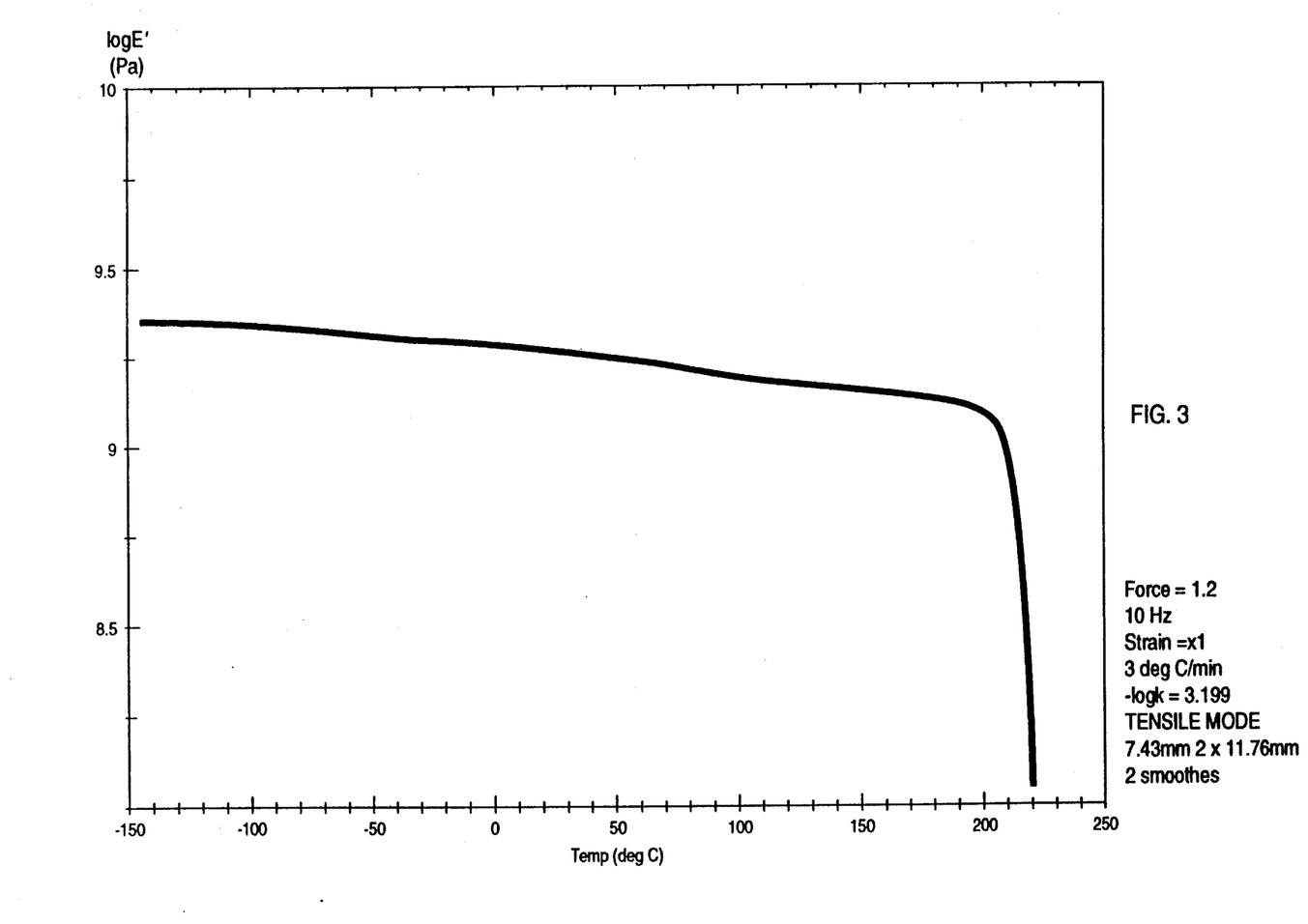
FIG. 3 is a curve showing engineering modulus vs. temperature for a random 1:1 Bisphenol-A/Tetrabromobisphenol-A copolycarbonate.
Figure 4:
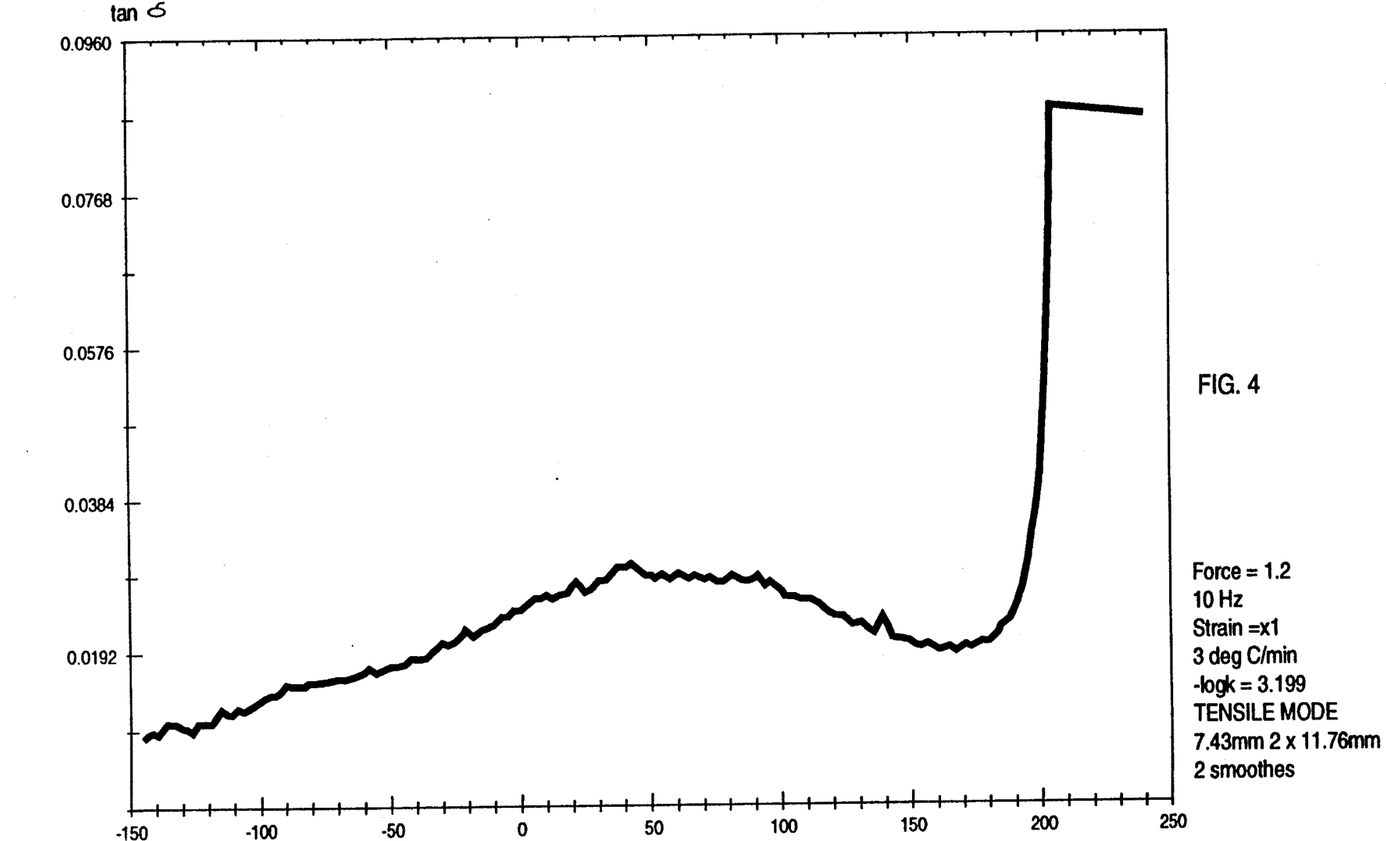
FIG. 4 is a curve showing the first derivative of the curve shown in FIG. 3

The differences in engineering modulus behavior between a block and random copolycarbonate can also be seen in FIG. 2 and FIG. 4. The tan delta curve for the copolycarbonate of Control A, in FIG. 2, shows secondary transition at two temperatures, one for each block, whereas the tan delta curve for Example 1, in FIG. 4, shows a secondary transition at an average temperature only. Control A shows a secondary transition at about $-100°$ C., corresponding to the Bisphenol-A carbonate block. The engineering modulus of this material decreases after this transition. A second secondary transition is observed for Control A at about $+100°$ C., corresponding to the Tetrabromobisphenol-A carbonate block. However, the copolycarbonate of Example 1 shows a single secondary transition at about 50° C. and thus does not have a major decrease in modulus at temperatures below 50° C.

It is within the skill in the art to practice this invention in numerous modifications and variations in light of the above teachings It is, therefore, to be understood that changes may be made in the various described embodiments of this invention without departing from the spirit and scope of this invention as defined by the appended claims.

What is claimed is:

1. A process for the preparation of a random copolycarbonate comprising
    (a) contacting an ortho-substituted dihydric phenol and a carbonate precursor to form the bis(carbonate precursor)ester of the ortho-substituted dihydric phenol
    (b) contacting the bis(carbonate precursor)ester with a non-ortho-substituted dihydric phenol to form a random carbonate oligomer,
    (c) contacting the random carbonate oligomer with a carbonate precursor to form a random copolycarbonate, and
    (d) recovering the random copolycarbonate.

2. The process of claim 1 wherein step (b) further comprises contacting the bis(carbonate precursor)ester with a non-ortho-substituted dihydric phenol and a coupling catalyst to form a carbonate oligomer.

3. The process of claim 1 wherein the random copolycarbonate recovered in step (d) has a weight average molecular weight of about 10,000 to about 400,000.

4. The process of claim 1 wherein the random copolycarbonate recovered in step (d) is characterized by a number average sequence length less than or equal to that given by a random distribution within the copolycarbonate molecule of the respective residues of the ortho-substituted dihydric phenol and the non-ortho-substituted dihydric phenol.

5. An interfacial process for the preparation of a random copolycarbonate comprising
    (a) contacting the dianion of an ortho-substituted dihydric phenol with a carbonate precursor to form the bis(carbonate precursor)ester of the ortho-substituted dihydric phenol,
    (b) contacting the bis(carbonate precursor) ester with the dianion of a non-ortho-substituted dihydric phenol and a 2- or 4-substituted pyridine coupling catalyst to form a random carbonate oligomer,
    (c) contacting the random carbonate oligomer with a carbonate precursor to form a random copolycarbonate, and
    (d) recovering the random copolycarbonate.

6. The process of claim 5 wherein (a) the ortho-substituted dihydric phenol is one or more of the dihydric phenols described by the formula wherein:
(I) Z is (A) a divalent radical, of which all or different portions are (i) linear, branched, cyclic or bicyclic, (ii) aliphatic or aromatic, and (iii) saturated or unsaturated, said divalent radical being composed of 1–35 carbon atoms together with up to five atoms selected from the group consisting of oxygen, nitrogen, sulfur, phosphorous and halogen atoms; or (B) S, $S_2$, SO, $SO_2$, O or CO; or (C) Z is a single bond;
(II) each X is independently halogen, or a $C_1$–$C_{12}$ linear or cyclic alkyl, alkoxy, aryl or aryloxy radical; and
(III) a, b, c, and d are each 0 or 1, provided that when a is 0, d is 1; and when d is 0, c is 1;
and (b) the non-ortho-substituted dihydric phenol is one or more of the dihydric phenols described by the formula above which has only hydrogen bonded to the carbon atoms which are ortho to the hydroxy group on both phenyl rings.

7. The process of claim 5 wherein (a) the ortho-substituted dihydric phenol is either 2,2-bis(3,5-dibromo, 4-hydroxyphenyl)propane or 2,2-bis(3,5-dimethyl, 4-hydroxyphenyl)propane, or both, and (b) the non-ortho-substituted dihydric phenol is 2,2-bis (4-hydroxyphenyl)propane.

8. The process of claim 2 wherein the coupling catalyst is a 2- or 4-substituted pyridine.

9. The process of claim 1 wherein (a) the ortho-substituted dihydric phenol is one or more of the dihydric phenols described by the formula wherein:
(I) Z is (A) a divalent radical, or which all or different portions are (i) linear, branched, cyclic or bicyclic, (ii) aliphatic or aromatic, and (iii) saturated or unsaturated, said divalent radical being composed of 1–35 carbon atoms together with up to five atoms selected from the group consisting of oxygen, nitrogen, sulfur, phosphorous and halogen atoms; or (B) S, $S_2$, SO, $SO_2$, O or CO; or (C) Z is a single bond;
(II) each X is independently halogen, or a $C_1$–$C_{12}$ linear or cyclic alkyl, alkoxy, aryl or aryloxy radical; and
(III) a, b, c, and d are each 0 or 1, provided that when a is 0, b is 1; when b is 0, a is 1; when c is 0, d is 1; and when d is 0, c is 1;

and (b) the non-ortho-substituted dihydric phenol is one or more of the dihydric phenols described by the formula above which has only hydrogen bonded to the carbon atoms which are ortho to the hydroxy group on both phenyl rings.

10. The process of claim 1 wherein (a) the ortho-substituted dihydric phenol is either 2,2-bis(3,5-dibromo,4-hydroxyphenyl)propane or 2,2-bis(3,5-dimethyl,4-hydroxyphenyl)propane, or both, and (b) the non-ortho-substituted dihydric phenol is 2,2-bis(4-hydroxyphenyl)propane.

11. The process of claim 5 wherein, in step (a), the dianion of the ortho-substituted dihydric phenol is contacted with the carbonate precursor in an aqueous alkaline solution of an alkali metal or alkaline earth metal phosphate, bicarbonate, oxide or hydroxide while the pH of said aqueous alkaline solution is maintained at about the pH of an aqueous equilibrium solution of the dimetal salt of the ortho-substituted dihydric phenol.

12. The process of claim 11 wherein the dianion of the ortho-substituted dihydric phenol is contacted with the carbonate precursor until there is a substantial absence of the dianion in the aqueous alkaline solution.

13. The process of claim 11 wherein step (c) further comprises contacting the random carbonate oligomer with a carbonate precursor until the pH of the aqueous alkaline solution reaches a level below that of an aqueous equilibrium solution of the dimetal salt of the less acidic of the ortho-substituted dihydric phenol and the non-ortho-substituted dihydric phenol.

14. The process of claim 5 wherein, in step (b), the dianion of the non-ortho-substituted dihydric phenol is contacted with the bis(carbonate precursor) ester of the ortho-substituted dihydric phenol in a mixture of an organic solvent and an aqueous alkaline solution of an alkali metal or alkaline earth metal phosphate, bicarbonate, oxide or hydroxide, while the pH of said aqueous alkaline solution is maintained at about the pH of an aqueous equilibrium solution of the dimetal salt of the non-ortho-substituted dihydric phenol.

15. The process of claim 14 wherein the dianion of the non-ortho-substituted dihydric phenol is contacted with the bis(carbonate precursor) ester of the ortho-substituted dihydric phenol until there is a substantial absence of the bis(carbonate precursor) ester in the organic phase.

16. The process of claim 14 wherein step (c) further comprises contacting the random carbonate oligomer with a carbonate precursor until the pH of the aqueous alkaline solution reaches a level below that of an aqueous equilibrium solution of the dimetal salt of the less acidic of the ortho-substituted dihydric phenol and the non-ortho-substituted dihydric phenol.

17. The process of claim 5 wherein the random copolycarbonate recovered in step (d) has a weight average molecular weight of about 10,000 to about 400,000.

18. The process of claim 5 wherein the random copolycarbonate recovered in step (d) is characterized by a number average sequence length less than or equal to that given by a random distribution within the copolycarbonate molecule of the respective residues of the ortho-substituted dihydric phenol and the non-ortho-substituted dihydric phenol.

* * * * *